May 6, 1947. C. A. ELLIS 2,420,032
TRIAL FRAME
Filed Aug. 7, 1944
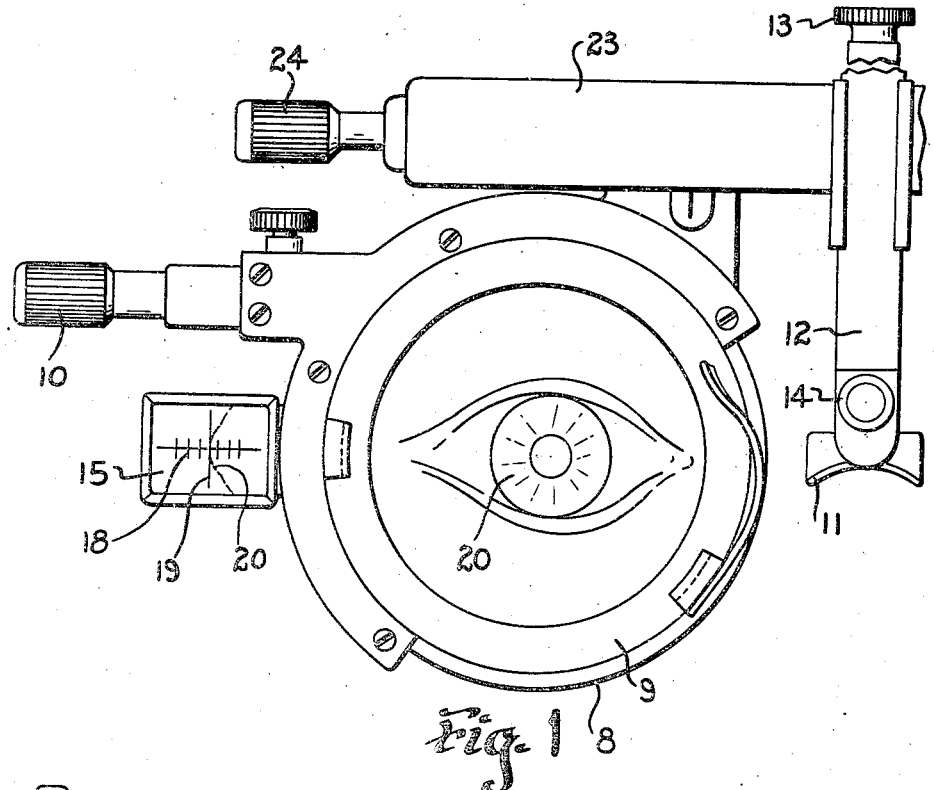
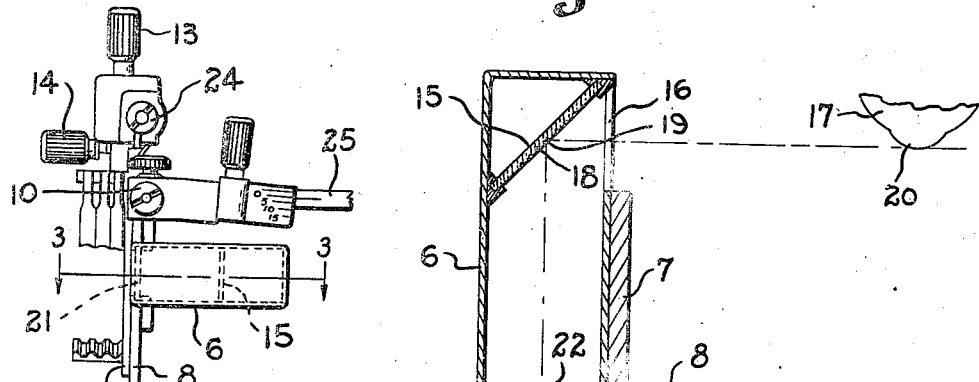
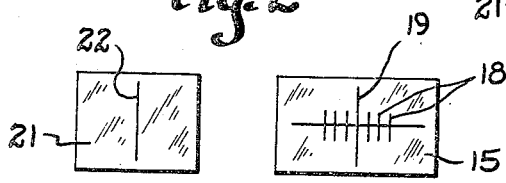
INVENTOR.
CHARLES A. ELLIS
BY
Louis L. Gagnon
ATTORNEY Patented May 6, 1947

2,420,032

UNITED STATES PATENT OFFICE 2,420,032

TRIAL FRAME

Charles A. Ellis, Southbridge, Mass., assignor to American Optical Company, Southbridge, Mass., a voluntary association of Massachusetts Application August 7, 1944, Serial No. 548,381

3 Claims. (Cl. 88—20)

This invention relates to improvements in trial frames and more particularly to a trial frame adapted for use with test lenses which have been computed to measure the errors of refraction of the eyes in the so-called vertex refraction or effective power, namely with the power calculated from the eye or ocular side of the lenses.

One of the principal objects of the invention is to provide a sighting device for a trial frame of the above character whereby the trial lenses may be positioned and supported at an accurate predetermined distance from the eyes.

Another object of the invention is to provide a sighting device of the above character having sighting means which may be aligned with the cornea of the eye by observations from the front of the trial frames and which will enable the lenses to be more accurately spaced from the eyes while affording ease in checking the relation of the lens cells of the trial frames with the eyes during the performing of the actual tests.

Another object is to provide an aligning device of the above character having engraved lines thereon with means for superpositioning an image of the cornea of the eye upon said lines for determining the related position of the lens cells of the trial frame with the said cornea of the eye.

Other objects and advantages of the invention will become apparent from the following description taken in connection with the accompanying drawings and it will be apparent that many modifications may be made in the details of construction and arrangement of parts without departing from the spirit of the invention as expressed in the accompanying claims. I, therefore, do not wish to be limited to the exact details and arrangements shown as the preferred form only has been given by way of illustration.

Referring to the drawings:

Fig. 1 is a front elevational view of one of the lens cells of a conventional type trial frame to which the device embodying the invention is applied;

Fig. 2 is a side elevational view of the trial frame illustrated in Fig. 1;

Fig. 3 is a fragmentary enlarged sectional view taken as on line 3—3 of Fig. 2 and looking in the direction indicated by the arrows and diagrammatically illustrating the use of the device; and Figs. 4 and 5 are face views of parts of the optical system of the device.

This invention relates to that type of instrument known as a trial frame by which an oculist or optometrist measures the errors of refraction of the eyes of a patient with trial lenses for determining the optical characteristics required of prescriptive lenses for correcting the visual errors of said patient. Said lenses are to be made to the so-called vertex refraction.

It is particularly pointed out that lenses made to the so-called vertex refraction are lenses of the type having the power thereof calculated for a given distance from the eye to the ocular surface thereof at which distance the said prescriptive lens is to be worn from the eye.

The present invention is an improvement of a trial frame of the type disclosed in the W. J. Wrighton et al. Patent No. 1,794,571, issued March 3, 1931, which trial frame is designed to test the refractive errors of eyes utilizing the theory set forth above.

It is particularly pointed out that in trial frames in which the cells are arranged for vertex refraction or effective power it is important to have the cornea at a fixed distance from the trial lens system.

In present frames of this type the lens cells are adjusted with respect to the cornea with the aid of a sighting device requiring the refractionist to make his observations first from one side of the patient and then from the other side.

It, therefore, is one of the prime objects of the present invention to overcome this difficulty through the provision of a sighting device which will enable the refractionist to make his observations from the front of the trial frame only.

Referring more particularly to the drawings wherein like characters of reference indicate like parts of the several views, the device embodying the invention comprises a tubular member 6 secured to a rearwardly extending support 7 formed integrally with the lens cells supporting means 8 of the trial frame. The lens cells 9 carried by said support 8 are of the conventional type adapted to be rotated by means of a finger piece 10 in the conventional manner. Rotation takes place through the provision of a gear member carried by said rotatable member 10 meshing with a ring gear formed on the periphery of the trial lens cells in which the trial lenses are placed.

It is to be understood that the invention may be embodied with any trial frame of the conventional type, one of which is shown in the above mentioned Wrighton et al. patent. Such a trial frame is provided with a nose piece 11 carried by a support 12 which may be raised or lowered by manipulation of a finger piece 13 and which will permit the nose piece 11, in addition to being raised or lowered, to be moved inwardly or outwardly with respect to the plane of the lens cells by manipulation of the finger piece 14. The tubular member 6 is provided adjacent the rear thereof with an aligning member comprising an angled mirror 15 facing an opening 16 in the side of the tube toward the eye 17 of the individual. The face of the mirror or refractor 15 is provided with a plurality of spaced lines 18 preferably one millimeter apart which forms a scale on the face of the mirror. The said scale is provided with a vertical center line 19 which constitutes the zero position or accurate position of the lens cells from the eyes as determined by vertex refraction or effective power; that is, when the outer surface of the image of the cornea 20 is aligned with the line 19 as shown in Fig. 1, the lens cells supporting the trial lenses will automatically position the ocular surface of said lenses at the accurate distance from the cornea according to the vertex refraction or effective power principles. The shorter lines 18 will indicate the distance in millimeters that the trial lenses are in the front or rear of the predetermined desired distance. The outer surface of the cornea 20 may be aligned with the center line 19 by adjusting the bridge or nose piece 11 inwardly or outwardly thereby causing the lens cells to move inwardly or outwardly relative to the eye according to the extent of said adjustment of the nose piece.

The tubular member 6 is provided adjacent the forward end thereof with a sighting member comprising a transparent plate 21 having a vertical line 22 thereon simulating the line 19, and which is adapted to be optically aligned with the line 19 by sighting longitudinally of the tube 6 during the aligning of the image of the cornea with said line.

It is sometimes desired to locate lenses at a distance in front of the eyes an amount greater or less than the distance established by the line 19. In this instance the lines 18 will provide means whereby the extent of departure of said distance from said line 19 may be determined with the actual prescriptive lenses thereafter being modified according to said departure. This enables the refractionist to quickly and easily determine the actual distance of the lens cells from the cornea of the eye and enables an accurate determination of the actual prescriptive requirements of the lenses to be worn permanently by the patient.

The lens cell support 8 is adjusted longitudinally of a main support bar 23 by means of a thumb piece 24 whereby the distance from the centers of the lenses may be altered according to the interpupillary requirements of the patient. This is a conventional adjustment.

The trial frame is supported on the face of the wearer by suitable temples 25 in the conventional manner.

The lines 18, 19 and 22 may be formed on the members 15 and 21 by engraving, etching, painting, photographing or the like.

It is also to be understood that instead of using the mirror 15 a suitable prism may be used with the prism nearest the member 21 being provided with the scale markings 18 and 19. The mirror 15 may be of the front or rear surface type as desired.

From the foregoing it will be seen that simple, efficient and economical means have been provided for accomplishing all of the objects and advantages of the invention.

Having described my invention, I claim:

1. In an eye testing device, a main frame member having means for supporting a plurality of trial lenses for alignment with the respective eyes of an individual under test, said lenses being computed to introduce a controlled prescriptive value when supported at a given distance from the eyes, said means for supporting the trial lenses each having a sighting member carried thereby and extending rearwardly from adjacent the outer side thereof, a light deflecting member supported by said sighting member adjacent the rearmost end thereof with its reflecting surface disposed at an angle substantially 45° with respect to a sight line extending through said sighting member substantially perpendicular to the plane of the trial lens supporting means and with its reflecting surface exposed to receive an image of the cornea of the adjacent eye of the individual when the device is in position of use, said reflector having a main aligning means thereon positioned at a fixed distance rearwardly of the trial lens supporting means, which distance is controlled according to the computed values of the trial lenses, scale means on the opposed side of said main aligning means, means adjacent the forward end of the sighting member having aligning means thereon adapted to be aligned with the main aligning means on the light deflecting member and means for altering and controlling the distance between the trial lens supporting means and the eyes of the patient whereby the main aligning means on the light deflecting means or selected graduation of the scale means may be aligned with the corneal surface of the adjacent eye as viewed through the sighting member.

2. In an eye testing device, the combination of a supporting bar, a pair of lens cells mounted on said bar for supporting a plurality of trial lenses for alignment with the respective eyes of an individual under test, said lenses being computed to introduce a controlled prescriptive value when supported at a given distance from the eyes, a sighting member carried by each cell and extending rearwardly from adjacent the outer side thereof, a light deflecting member supported by said sighting member adjacent the rearmost end thereof with its reflecting surface disposed at an angle substantially 45° with respect to a sight line extending through said sighting member substantially perpendicular to the plane of the lens cells and with its reflecting surface exposed to receive an image of the cornea of the adjacent eye of the individual when the device is in position of use, said reflector having main aligning means thereon positioned at a fixed distance rearwardly of the lens cells, which distance is controlled according to the computed values of the trial lenses, scale means on the opposed sides of said main aligning means, viewing means adjacent the forward end of the sighting member having aligning means thereon adapted to be aligned with the main aligning means on the light deflecting member and a nose bearing member carried by the supporting bar, said nose bearing member being adjustable in approximately normal relation to the plane of the lens cells so as to provide means for altering and controlling the distance between the lens cells and the eyes of the patient whereby the main aligning means on the light deflecting means or selected graduation of the scale means may be aligned with the corneal surface of the adjacent eye as viewed through the sighting member.

3. In an eye testing device, the combination of a supporting bar, a pair of lens cells mounted on said bar for supporting a plurality of trial lenses for alignment with the respective eyes of an individual under test, said lenses being computed to introduce a controlled prescriptive value when supported at a given distance from the eyes, said lens cells each having a tubular member carried thereby and extending rearwardly from adjacent the outer side thereof, each of said tubular members adjacent the forward ends thereof having a viewing member therein disposed substantially in the plane of the cell and each having an opening in the inner sidewall thereof adjacent its rearmost end, a light reflector in each of said tubular members adjacent the opening with its reflecting surface disposed at an angle substantially 45° with respect to a sight line extending through the tubular member substantially perpendicular to the plane of the lens cell and at an angle of substantially 45° with respect to the axis of the opening and with said reflecting surface exposed to receive an image of the cornea of the adjacent eye of the individual when the device is in position of use, said reflector having main aligning means thereon positioned at a fixed distance rearwardly of the trial lens supporting means, which distance is controlled according to the computed values of the trial lenses, scale means on the opposed sides of said main aligning means, aligning means on the viewing means adapted to be aligned with the main aligning means on the light reflector and a nose bearing member carried by the supporting bar, said nose bearing member being adjustable in approximately normal relation with the plane of the lens cells so as to provide means for altering and controlling the distance between the lens cells and the eyes of the patient whereby the main aligning means on the light reflector or selected graduation of the scale means may be aligned with the corneal surface of the adjacent eye as viewed through the tubular member.

CHARLES A. ELLIS.

REFERENCES CITED

The following references are of record in the file of this patent:

UNITED STATES PATENTS

| Number | Name | Date |
| --- | --- | --- |
| 1,481,926 | Poser | Jan. 29, 1924 |
| 1,833,482 | Brierton | Nov. 24, 1931 |
| 835,711 | Olsen et al. | Nov. 13, 1906 |
| 2,198,836 | Patton | Apr. 30, 1940 |
| 1,422,303 | Poser | July 11, 1922 |
| 1,165,597 | Henker | Dec. 28, 1915 |